US006264910B1

(12) United States Patent
Maurer et al.

(10) Patent No.: US 6,264,910 B1
(45) Date of Patent: Jul. 24, 2001

(54) PROCESS FOR THE PRODUCTION OF NITRIC ACID

(75) Inventors: Rainer Maurer, Schwelm; Erich Szonn, Witten; Wolfgang Seehars, Oberhausen; Lothar Mietze, Wesel, all of (DE)

(73) Assignee: Krupp Uhde GmbH, Dortmund (DE)

( * ) Notice: Subject to any disclaimer, the term of this patent is extended or adjusted under 35 U.S.C. 154(b) by 0 days.

(21) Appl. No.: 09/277,389

(22) Filed: Mar. 26, 2001

(30) Foreign Application Priority Data

Mar. 26, 1998 (DE) .............................. 198 13 233

(51) Int. Cl.[7] .................. C01B 21/38; C01B 21/40
(52) U.S. Cl. ............................ 423/392; 423/393
(58) Field of Search .......................... 423/390.1, 392, 423/393

(56) References Cited

U.S. PATENT DOCUMENTS 4,305,919 * 12/1981 Roller ................................ 423/392

FOREIGN PATENT DOCUMENTS 2041900   12/1979 (GB) .

OTHER PUBLICATIONS

H.-J. Prümper: "Moderne vielstufige Getriebekompressoren und ihr Einsatz in der Industrie" 6. Symposium Pumpen und Verdichter, TU Magdeburg, DDR, 11. –12.4.1989, Band 1 1989, Apr, Seite 187–201.
Uhde GmbH: "The Compact Plant", Nitrogen, May–Jun. 1995, S. 32,33.

* cited by examiner

Primary Examiner—Wayne Langel
Assistant Examiner—Maribel Medina
(74) Attorney, Agent, or Firm—Rosenman & Colin, LLP.

(57) ABSTRACT

A process for the production of nitric acid using the dual-pressure process in which the ammonia is burnt at an initial low pressure with the aid of compressed process air and the nitrous gases formed during combustion are at least partly absorbed by water at a second pressure which is higher than the first. This causes nitric acid to be produced and the pressure of the residual gas, which is not absorbed, is reduced to atmospheric pressure in a residual gas expander for the purpose of winning compression potential. Said process provides a solution aimed at optimising the production of nitric acid whilst improving the production parameters and the materials and energy balances.

Figure 1:
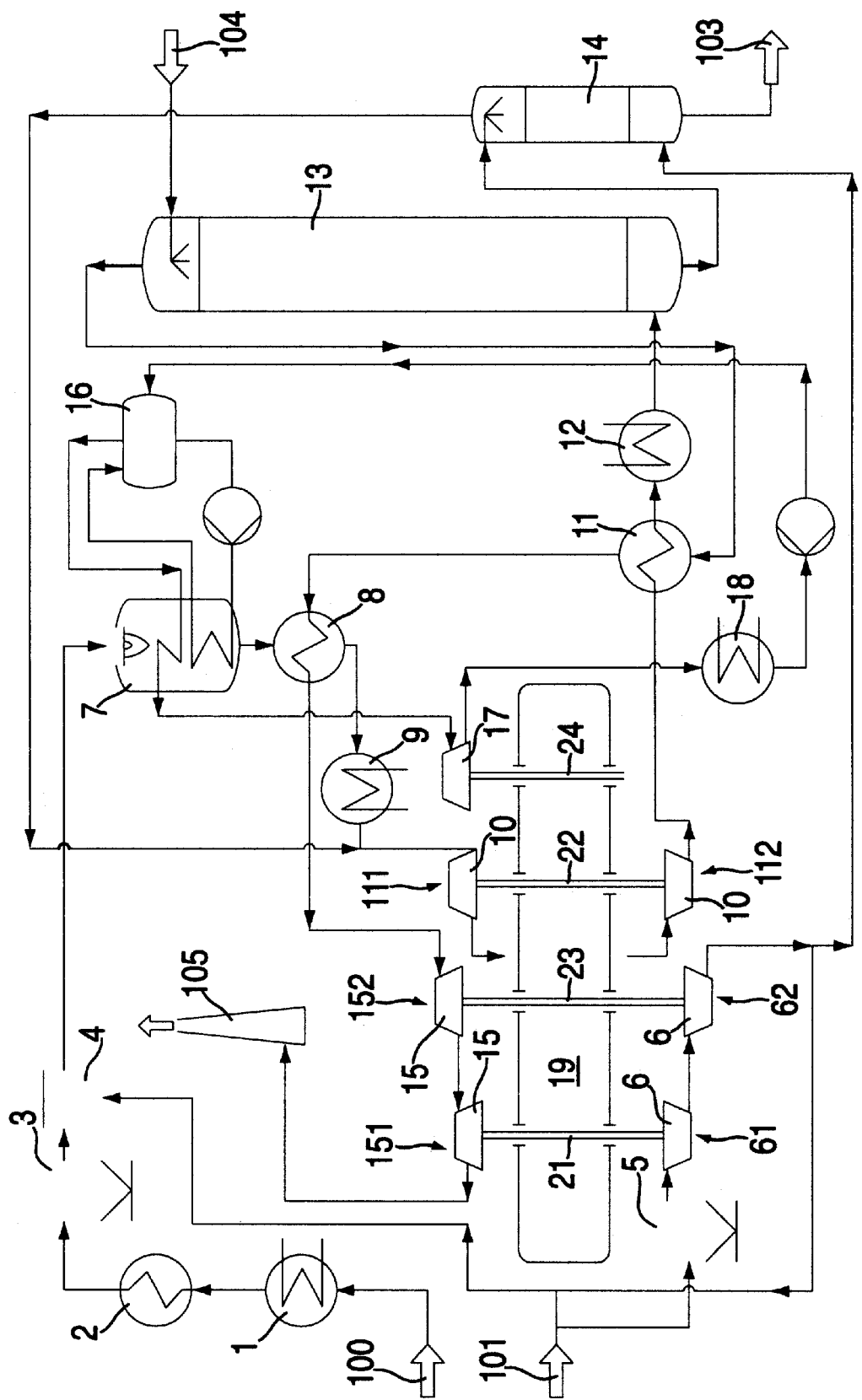

This is achieved by supplying a multishaft geared centrifugal compressor separately with process air and nitrous gas, the process air being compressed to the initial pressure and the nitrous gas being compressed to a second pressure.

7 Claims, 2 Drawing Sheets

PROCESS FOR THE PRODUCTION OF NITRIC ACID

The invention in question refers to a process for the production of nitric acid with integrated energy recovery.

In particular, a process for the production of nitric acid using the dual-pressure process is stated in which the ammonia is burnt at an initial low pressure with the aid of compressed process air and the nitrous gases formed during combustion are at least partly absorbed by water at a second pressure which is higher than the first. This causes nitric acid to be produced and the pressure of the residual gas, which is not absorbed, is reduced to atmospheric pressure in a residual gas expander for the purpose of winning compression potential.

In the first stage of the nitric acid production process, ammonia $NH_3$ is combined with air in a reaction to produce nitrogen oxide, NO:

$$4NH_3 + 5O_2 \rightarrow 4NO + 6H_2 = +907.3 kJ$$

The nitrogen oxide, NO, produced is then oxidised to form nitrogen dioxide, $NO_2$:

$$2NO + O_2 \rightarrow 2NO_2 + 113.1 kJ$$

The nitrogen dioxide, $NO_2$ is then absorbed in water resulting in the formation of nitric acid:

$$4NO_2 + O_2 + 2H_2O \rightarrow 4HNO_3 + 256.9./.390.3 kJ$$

To ensure that as much nitrogen dioxide as possible is absorbed by the water, the absorption process takes place at elevated pressure, preferably at pressures of between 4 and 14 bar.

The oxygen required to convert the ammonia feedstock is supplied as atmospheric oxygen. For this purpose the process air is compressed until the pressure complies with both the oxidation reaction and the absorption reaction.

The energy for compressing the air is produced by reducing the pressure of the residual gas leaving the absorption process to atmospheric pressure and by recycling the heat released during the chemical reactions.

Each nitric acid plant is adapted to the special requirements of its particular site.

Single-train nitric acid plants usually have a rated capacity of between 100 and 1,000 tpd nitric acid. Doubling the reaction capacity enables up to 2,000 tpd nitric acid to be produced in a single-train plant.

If the actual daily output required is very small, or if the site benefits from comparatively low energy costs, the nitric acid plant is operated using the single high-pressure process. In this process both the ammonia combustion process and the absorption of nitrogen oxide take place at a pressure of approx. 10 bar.

If, however, large nominal capacities and/or higher acid concentrations are required, the most economically feasible solution is provided by a nitric acid plant based on the dual-pressure process.

In the dual-pressure process the ammonia is combusted at an initial pressure which is lower than the absorption pressure. After cooling, the nitrous gases formed during combustion are pressurised in a nitrous gas compressor until the second pressure, the absorption pressure, is achieved.

Figure 2:
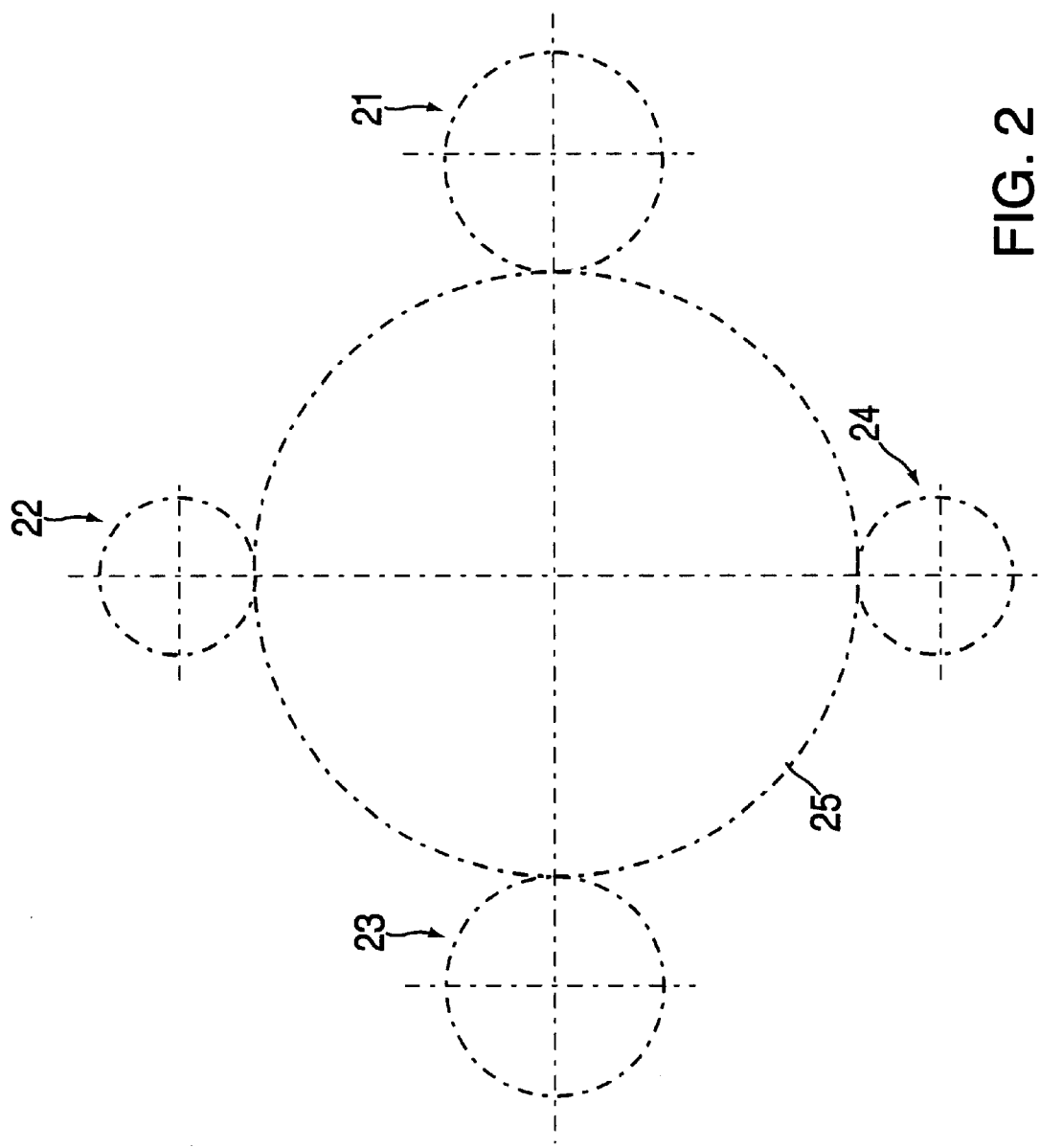

An article by W. Hanggeli entitled "Expansionsturbinen fur die Herstellung von Salpetersaure" is published on pages 29 to 31 of the corporate pamphlet "Technische Rundschau Sulzer" No. 2, 1986. FIG. 2 of this particular article shows a process flow diagram for a nitric acid production plant which operates according to the dual-pressure process.

The air compressor and the nitrous gas compressor in this nitric acid plant form a set of machines which are all driven by the same shaft coupled to a steam turbine and a residual gas expander. These four turbomachines, which are all coupled to the shaft, have an axial construction. The driving fluids intersperse the machine casing in a direction which is more or less parallel to the axis. FIGS. 1 to 7 show the overall length of the said set of machines. As this type of long, coupled turbogenerator requires a considerable amount of space, it often prevents the utilisation of a compact-design nitric acid plant. In addition, the transportation and/or alignment of these long machines can also be somewhat problematic.

A type of rotary compressor, the shaft length of which is considerably shorter than that of a compressor with an axial construction, has been known of for approx. 4 decades. At the centre of these so-called geared centrifugal compressors is a gear box with a large gear wheel which is moved by the drive-shaft speed of the driving mechanism e.g. an electromotor. The teeth of the large gear wheel mate with the teeth of at least one pinion shaft thereby increasing the drive shaft speed to that of the pinion shaft.

Up to four fast-running pinion shafts with differing transmission ratios can be arranged in the gear box around the large central gear wheel.

The turbocompressor's rotors, which convey media radially/centrifugally, are mounted at the ends of the pinion shafts. The rotors' overhang-type assembly means that the gear box also supports the compressor. The spiral casings of the compressor are flange-mounted to the gear box.

Up to four pinion shafts can be arranged on a multishaft machine with a large gear wheel, two pinion shafts being arranged horizontally, one being placed above the gear wheel and the fourth being placed below the gear wheel. In theory it is therefore possible to accommodate eight rotors in an overhang-type assembly.

Multishaft geared centrifugal compressors can be closely adapted to conform with the operational data required. The medium to be compressed is pressurised in stages until the maximum rated pressure is achieved. Each compression stage has its own rotor. The rotors are deployed in various sizes and with various blade mountings depending upon the operational requirements. The semi-concave rotors permit high flow rates as the blades are twisted and lean backwards. Fully-closed rotors achieve maximum efficiency.

Multishaft geared centrifugal compressors are now available in a variety of different designs.

European patent specification EP-0 440 902-B1 describes a geared centrifugal compressor in which an additional intermediate gear wheel is positioned next to the large, centrally situated gear wheel. Four rotors are driven by the large gear wheel coupled to two pinion shafts. Other pinion shafts are driven by intermediate gear wheels. This type of geared centrifugal compressor can be used to attain pressure ratios in excess of 80. However, such high pressure ratios do not occur in plants used for the production of nitric acid.

The German registered design entry G 92 01 858 also describes a geared centrifugal compressor for higher pressure ratios of between 60 and 80 and above. This geared centrifugal compressor is not particularly suited for use in nitric acid plants as such high pressure ratios do not occur in these plants.

The German publication of an unexamined application DE 42 39 138 deals with a compressor unit in which multishaft geared centrifugal compressors are used for low-pressure stages, whilst the high-pressure compressor stages are driven by a separate turbine which is fed by process fluids diverted from one of the low-pressure stages.

This type of compressor unit is not suitable for use in a nitric acid plant either as these high pressure ratios are not required in said plants.

The compressor unit described in DE 42 39 138 can be driven by an electromotor, but can also be driven by a gas turbine or a steam turbine. If a turbine is used to drive the unit, the large centrally located gear wheel can be driven via an additional reducing pinion coupled to the turbine shaft, provided that the speed of the said wheel is slower than that of the turbine.

In nitric acid plants based on the dual-pressure process, the drive mechanisms for both the steam turbines and the gas turbines are interconnected in parallel, hence the single-drive mechanism described in DE 42 39 138 is not suitable for these plants.

A further multishaft geared centrifugal compressor for conveying media at high pressure ratios of 60 and above is described in the European patent application EP 0 602 491. In this particular configuration the pinion shaft supporting the rotor is driven by the high rotational speed generated by the sun wheel of a planet gear.

This type of geared centrifugal compressor cannot be used in nitric acid plants either.

Their high degree of efficiency has meant that geared centrifugal compressors have been successfully used in plants such as mines or air separation plants, which are particularly cost-sensitive as regards energy consumption.

A further publication reports on the use of a four-stage multishaft geared centrifugal compressor for the supply of working air in open-cast limestone exploitation [1].

Multishaft geared centrifugal compressors are also used to transport gaseous nitrogen during the operation of a transfer pipeline. The 8-stage geared centrifugal compressor supplies 55,000 $Nm^3/h$ nitrogen at a maximum rated pressure of 80 bar [2].

Another journal article [3] refers to the use of a multishaft geared centrifugal compressor in a nitric acid plant. In this particular plant the nitric acid is produced using the single-pressure process. The triple-stage geared centrifugal compressor is used here solely to compress the combustion air and is driven in this case by a residual gas expander combined with a steam turbine or an electromotor.

The triple-stage geared centrifugal compressor has two pinion shafts each of which has two ends. Rotors for a turbocompressor are mounted on three of these ends. These produce the three-stage air compression which raises the pressure of the combustion air from atmospheric pressure to a pressure of approx. 10 bar which is required for the combustion of ammonia. The residual gas expander has two stages and an axial construction. Its drive-shaft end is directly coupled to the fourth end of the pinion shaft of the geared centrifugal compressor, this end not being equipped with a rotor. The rotational speed of a pinion shaft is therefore identical to the rotational speed of the residual gas expander.

The multishaft geared centrifugal compressor described in [3] has the disadvantage of having only two pinion shafts and cannot therefore be used in the dual-pressure process for producing nitric acid. A further drawback of the process described in [3] is that it can only be used for plants with comparatively low daily production capacities.

The group of companies named "Atlas-Copco" regularly publishes a publication entitled "Applied Compressor & Expander Technique". On pages 18 to 21 of an article entitled "Expander Improvements in Ethylene Plants", which was published in 1994 vol. 3. issue 2, Dr Reza Agabi and Dr Bebrooz Ershagi report on the use of radial expanders in plants used for the production of ethylene. No reference is made to the possibility of using radial expanders with an inward flow pattern in the expander rotor in plants for the production of nitric acid in addition to their use in ethylene plants.

The present invention aims to provide a process or a plant for the production of nitric acid which manages to optimise nitric acid production whilst avoiding or reducing the above-mentioned disadvantages and improving the production parameters and the materials and energy balances.

Using a process described in the introduction the invention fulfils these requirements in that a multishaft geared centrifugal compressor is supplied separately with process air and nitrous gas, the process air being compressed to achieve the initial pressure and the nitrous gas being compressed such that the second pressure is achieved.

The invention uses a single multishaft geared centrifugal compressor to treat the process streams necessary for the production of nitric acid and to achieve the required pressures in just one machine.

Further embodiments of the invention provide for specific procedures and items of equipment suitable for achieving the aim specified in the invention.

One procedure can be such that the compression potential generated by the residual gas expander can be used at least partly to drive the nitrous gas compressor stages and/or air compressor stages of the multishaft geared centrifugal compressor.

A further embodiment of the invention is such that the compressor potential generated by one or more shaft drive-ends of a residual gas expander unit is directly transferred, at the same speed, to at least one of the pinion shafts of one single multishaft geared centrifugal compressor.

In principle the multishaft geared centrifugal compressor can be driven by various types of drive. For example, in the embodiment according to the invention, an electromotor, a diesel engine or a gas or steam turbine can be used to drive the large gear wheel, although a further embodiment can be such that one of the pinion shafts belonging to the multishaft geared centrifugal compressor is directly driven by a gas or steam turbine and with the same number of revolutions. The other machines are then also driven by this drive-shaft.

A further embodiment of the invention is such that the compressed air from the low-pressure stage of the air compressor of the multishaft geared centrifugal compressor is passed on directly to the high-pressure stage without first being cooled. A further development of this embodiment can also provide for the compressed nitrous gases to be passed on from the low-pressure stage of the nitrous gas compressor of the multishaft geared centrifugal compressor to the high-pressure stage without first being cooled.

As a solution to the above problem, the invention assumes a plant for the production of nitric acid which uses the dual-pressure process and has an $NH_3$ burner for combusting the ammonia in an initial low-pressure stage, a compressor for supplying the process air, an absorption tower for partially absorbing the nitrous gas using water and for discharging the nitric acid and a residual gas expander for winning compression potential and for reducing the pressure from the second pressure level to atmospheric pressure. The said plant concept also provides for a multishaft geared centrifugal compressor to be installed in the plant with a compressor for compressing the process air to the initial pressure and with a nitrous gas compressor for compressing the nitrous gas to a second pressure.

This type of plant has all the advantages which are mentioned above in the description of the procedure. It can also have a particularly compact construction as only one single multishaft geared centrifugal compressor is needed for the compression and decompression stages.

Embodiments of the plant designed in accordance with the invention are such that the plant has a single multishaft geared centrifugal compressor with four pinion shafts, the first and the third pinion shaft being installed in the horizontal central plane fixed by the axis of the large gear wheel, the second pinion shaft being arranged centrally above the large gear wheel and the fourth pinion shaft being arranged centrally below the large gear wheel.

In addition, rotors from compressors/expanders can be coupled to both ends of at least three of the pinion shafts.

One embodiment of the plant for example is such that the first pinion shaft is coupled to the rotor from the low-pressure stage of one air compressor at one end and to the rotor from the low-pressure stage of the residual gas radial expander at the other. The second pinion shaft is coupled to the rotor from the low-pressure stage of a nitrous gas compressor at one end and to the rotor from the high-pressure stage of the said nitrous gas compressor at the other. The rotor from the high-pressure stage of the said residual gas radial expander is coupled to one end of the third pinion shaft and the rotor from the high-pressure stage of the said air compressor is coupled to its other end. One end of the fourth pinion shaft is driven directly by, and with the same number of revolutions as the drive-shaft end on the drive side of a steam turbine used to convert process heat and has nothing on its other end.

Further characteristics, details and advantages of the invention can be found in the following description and in the drawings which show:

FIG. 1—a process flow sheet with a simplified version of a multishaft geared centrifugal compressor in accordance with the invention and in FIG. 2—a schematic view of the arrangement of the pinion shafts with regard to the large gear wheel of the multishaft geared centrifugal compressor.

In FIG. 1 three-figure reference symbols denote the incoming and outgoing mass flow rates. The reference symbol 100 represents the inlet for liquid $NH_3$, 101 the inlet for the process air, 104 the inlet for the process water and 103 the outlet for the nitric acid leaving the plant. The exhaust air is symbolically portrayed as a chimney and is denoted by the reference symbol 105.

The liquid $NH_3$ entering the plant (100) supplies an $NH_3$ evaporator (1), an $NH_3$ gas preheater (2), an $NH_3$ filter (3) and is then supplied to an $NH_3$ air mixer (4).

Upon entering the air mixer (4) the process air (101) has already flowed through an air filter (105) and an air compressor (6) and so enters the $NH_3$ air mixer at increased pressure. The $NH_3$ air/air mixture is fed to an $NH_3$ air burner with a LaMont waste heat boiler (7) and then conveyed via a residual gas heater (8) before being supplied to the two-stage nitrous gas compressor (10) via an initial nitrous gas cooler (9). Beyond this a residual gas heater (11) and a nitrous gas cooler (12) are located in the course of flow of the nitrous gas, the nitrous gas entering the absorption tower (13) at the bottom, process water (104) being supplied at the top. The nitric acid (103) then leaves the process via the $HNO_3$ deaerator (14).

The residual gas leaves the dome of the absorption tower and is fed via the residual gas heater (11) and the residual gas heater (8) to the residual gas radial expander (15), from where it is released into the atmosphere via the chimney (105).

Fundamental to the present invention is the multishaft geared centrifugal compressor (19), a simplified version of which is shown in FIG. 1, although the large gear wheel marked as (25) in FIG. 2 is not shown. The pinion shafts (21 to 24) are shown in FIG. 1.

Each end of the pinion shaft (22) is coupled to a stage of the nitrous gas compressor (10), the low-pressure stage being denoted by 111 and the high-pressure stage of the nitrous gas compressor being denoted by 112.

Both pinion shaft (21) and pinion shaft (23) are coupled at one end to a separate stage of the residual gas radial expander (15). The high-pressure stage (152) and the low-pressure stage (151) are then supplied with residual gas, whilst two stages of the air compressor (6) are coupled to the corresponding opposite ends of the shafts. The low-pressure stage (61) is coupled to the pinion shaft (21), whilst the high-pressure stage (62) of the air compressor is coupled to the end of the pinion shaft (23).

In addition to pinion shafts (21, 22 and 23), the large gear wheel (25) of the multishaft geared centrifugal compressor mates with one of the pinions of the shaft (24). The shaft (24) is coupled to a condensing steam turbine (17), which is supplied with steam from the steam collecting drum (16), this steam having been supplied to the steam collecting drum (16) via the condenser (18).

The pinion shaft (22) of the nitrous gas compressor is situated on the large gear wheel (25) and the fourth pinion shaft (24) of the condensation steam turbine (17) is situated underneath the large gear wheel. The pinion gears of the pinion shafts (21 and 23) are arranged to the left and right of the large gear wheel (25) on a common horizontal central plane, as shown in FIG. 2.

The following information is given as an example of a feasible machine configuration. The example is based on a nitric acid plant, which uses the dual-pressure process described here, and which has an output of 900 tpd nitric acid referred to a 100% concentration. The examples refer to a multishaft geared centrifugal compressor of the type described:

Technical data:
Compressor:

| Fluid: | | Air | NO gas |
|---|---|---|---|
| Flow rate | | | |
| STP conditions, wet  0° C., 1.013 bar | m³/h | 145,880 | 132,140 |
| Suction conditions | m³/h | 164,591 | 37,653 |
| Inlet conditions: | | | |
| suction pressure, abs. | bar | 0.98 | 4.2 |
| suction temperature | ° C. | 2.5 | 50 |
| relative humidity | pct | 60 | |
| Outlet conditions: | | | |
| discharge pressure, abs. | bar | 4.6 | 12.0 |
| discharge temperature, approx. | ° C. | 220 | 177 |
| Compressor speed, approx. | rpm. | 7,250/10.374 | 13.668 |
| Power required at coupling | kW | 10,792 | 6,492 |

Expander:

| Fluid: | | |
|---|---|---|
| STP flow rate | m³/h | 116,550 |
| Inlet pressure, abs. | bar | 10.9 |
| Inlet temperature, approx. | ° C. | 420 |

-continued

| Expander: | | |
|---|---|---|
| Outlet pressure, abs | bar, | 1.09 |
| Outlet temperature, approx. | ° C. | 150 |
| Power output at coupling | kW | 11,608 |
| Speed | rpm | 10,374/7,250 |
| Steam turbine: | | |
| Live-steam pressure | abs. bar | 60 |
| Live-steam temperature | ° C. | 450 |
| Condenser: | | |
| Pressure, abs | bar | 0.1 |
| Power output at coupling | kW | 5,676 |
| Steam flow | kg/h | 21,350 |
| Speed | rpm | 8,700 |

What is claimed is:

1. A process for the production of nitric acid using a dual-pressure process in which ammonia is burnt at an initial low pressure with the aid of compressed process air and nitrous gases formed during combustion are at least partly absorbed by water at a second pressure which is higher than the first to produce nitric acid, wherein the pressure of residual gas, which is not absorbed, is reduced to atmospheric pressure in a residual gas expander to win compression potential, and further wherein a multishaft geared centrifugal compressor is supplied separately with process air and nitrous gas, and the process air is compressed to achieve the initial pressure and the nitrous gas is compressed such that the second pressure is achieved.

2. The process in accordance with claim 1, wherein the compression potential generated by the residual gas expander is used at least partly to drive nitrous gas compressor stages and/or air compressor stages of the mutishaft geared centrifugal compressor.

3. The process in accordance with claim 1 or 2, wherein the compressor potential generated by one or more driveshaft ends of the residual gas expander is directly transferred, at the same speed, to at least one of the pinion shafts of a single multishaft geared centrifugal compressor.

4. The process in accordance with claim 1 or 2, wherein a large gear wheel of one multishaft geared centrifugal compressor is driven either by an electromotor, a diesel engine, or a gas or steam turbine.

5. The process in accordance with claim 1 or 2, wherein one of the pinion shafts belonging to the multishaft geared centrifugal compressor is directly driven by a gas or steam turbine and with the same number of revolutions.

6. The process in accordance with claim 1 or 2, wherein the compressed air from a low-pressure stage of the air compressor of the multishaft geared centrifugal compress is passed on directly to a high-pressure stage without first being cooled.

7. The process in accordance with claim 1 or 2, wherein the compressed nitrous gases from a low-pressure stage of the nitrous gas compressor of the multishaft geared centrifugal compressor are passed on directly to a high-pressure stage without first being cooled.

* * * * *